US010296322B2

(12) United States Patent
Mori et al.

(10) Patent No.: US 10,296,322 B2
(45) Date of Patent: May 21, 2019

(54) CONTROLLER AND CONTROL PROGRAM UPDATING METHOD

(71) Applicant: FUJITSU TEN LIMITED, Kobe-shi, Hyogo (JP)

(72) Inventors: Naoto Mori, Kobe (JP); Shigeto Umeyama, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 63 days.

(21) Appl. No.: 15/792,043

(22) Filed: Oct. 24, 2017

(65) Prior Publication Data

US 2018/0232224 A1 Aug. 16, 2018

(30) Foreign Application Priority Data

Feb. 15, 2017 (JP) ................. 2017-026329

(51) Int. Cl.
*G06F 8/65* (2018.01)
*G06F 1/26* (2006.01)
*G06F 9/4401* (2018.01)

(52) U.S. Cl.
CPC ............. *G06F 8/65* (2013.01); *G06F 1/26* (2013.01); *G06F 9/4401* (2013.01)

(58) Field of Classification Search
CPC ........................................................ G06F 8/65
USPC ................................................ 717/168–173
See application file for complete search history.

(56) References Cited

U.S. PATENT DOCUMENTS

| 2006/0259207 | A1* | 11/2006 | Natsume | ................ G06F 8/65 701/1 |
| 2010/0313192 | A1* | 12/2010 | Natsume | ................ G06F 8/65 717/168 |
| 2014/0068590 | A1* | 3/2014 | Natsume | ................ G06F 8/65 717/170 |
| 2014/0297955 | A1* | 10/2014 | Yamazaki | ............ G06F 3/0604 711/118 |

FOREIGN PATENT DOCUMENTS

JP 2014-118071 A 6/2014

* cited by examiner

*Primary Examiner* — Qing Chen
(74) *Attorney, Agent, or Firm* — Oliff PLC (57) ABSTRACT

A controller according to an embodiment includes a main processing unit and a storage. The main processing unit shifts, when receiving an updating request of a control program during executing this control program, to program shifting through a restart in a state where a device power source is held. The program shifting starts an updating program for updating the control program instead of the control program. The storage is configured to be able to hold information while the device power source is held. The main processing unit causes the storage to store, before the restart, update requesting information indicating that the updating request is received, causes the storage to store a history of the restart, and performs a start determination on the updating program on the basis of the update requesting information and the history that are referred after the restart.

7 Claims, 7 Drawing Sheets

| RESET TYPE | UPDATE REQUESTING INFORMATION | SOFT-RESET HISTORY | PROGRAM TO BE STARTED |
|---|---|---|---|
| SOFT-RESET | × | × | CONTROL PROGRAM |
| | O | × | ″ |
| | × | O | ″ |
| | O | O | UPDATING PROGRAM |
| HARD-RESET (INCLUDING INITIAL POWER-ON) | - | - | CONTROL PROGRAM |

O: PRESENT, ×: ABSENT, -: ARBITRARY

CONTROLLER AND CONTROL PROGRAM UPDATING METHOD

CROSS-REFERENCE TO RELATED APPLICATION

This application is based upon and claims the benefit of priority of the prior Japanese Patent Application No. 2017-026329, filed on Feb. 15, 2017, the entire contents of which are incorporated herein by reference.

FIELD

The embodiment discussed herein is directed to a controller and a control program updating method.

BACKGROUND

Conventionally, there is known Electronic Control Units (ECUs) that are provided in a vehicle so as to control electronically respective various systems of the vehicle, such as an engine, a transmission, and a car navigation device. Each of these controllers reads and executes a control program that is preliminary held in a corresponding built-in microcontroller (hereinafter, may be referred to as "microcomputer") so as to realize assigned various functions.

There exists, in some cases, a case where such a control program of the controller is to be updated (reprogrammed) when a function is added thereto or when an abnormality is found out after the fact (see Japanese Laid-open Patent Publication No. 2014-118071, for example).

At the time of this updating in the microcomputer, a control program is temporarily stopped for the updating and an updating program is started so as to rewrite the control program. For example, a microcomputer starts the updating program instead of the control program caused by a soft reset as an opportunity.

The soft reset is a restart method in a state where a device power source is held, and a microcomputer is rebooted in a state where information on a program start is expanded in a Random Access Memory (RAM), for example.

However, the above conventional technology has room for improvement in preventing an erroneous start of an updating program.

Specifically, the microcomputer determines whether or not the updating program is to be started, instead of the control program, with reference to information on the program start that is expanded in the above RAM, for example. However, there exists a fear that a soft reset causes RAM garbling and the like in this information expanded in the RAM so that the information has an incorrect value.

When the information has an incorrect value, a microcomputer does not start an updating program when the microcomputer is to start it, or reversely starts an updating program when the microcomputer is not to start it, namely there exists a fear that the microcomputer erroneously starts an updating program.

SUMMARY

A controller according to an aspect of an embodiment includes a main processing unit and a storage. The main processing unit shifts, when receiving an updating request of a control program during executing the control program, to program shifting through a restart in a state where a device power source is held, the program shifting starting an updating program for updating the control program instead of the control program. The storage is configured to be able to hold information while the device power source is held. The main processing unit causes the storage to store, before the restart, update requesting information indicating that the updating request is received, causes the storage to store a history of the restart, and performs a start determination on the updating program based on the update requesting information and the history that are referred after the restart.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Hereinafter, an exemplary embodiment of a controller and a control program updating method disclosed in the present application will be described in detail with reference to the accompanying drawings. Moreover, it is not intended that the present disclosure be limited to the embodiment described below.

Hereinafter, the outline of a control program updating method according to the present embodiment will be explained with reference to FIGS. 1A to 1D, next, an Electronic Control Unit (ECU) 10 (corresponding to one example of "controller") to which the control program updating method according to the present embodiment is to be applied will be explained with reference to FIGS. 2 to 6.

Figure 1A:
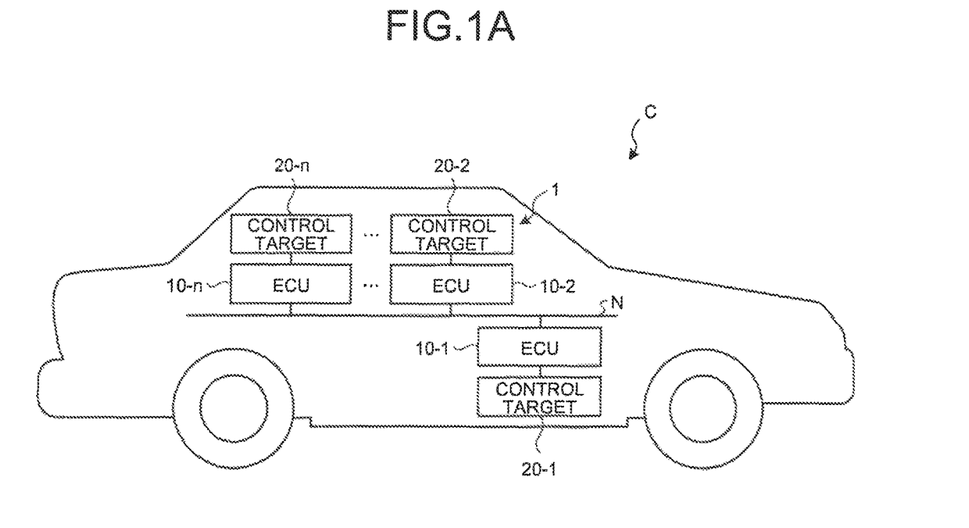
FIG. 1A is a diagram illustrating the outline of an on-vehicle system.
Figure 1B:
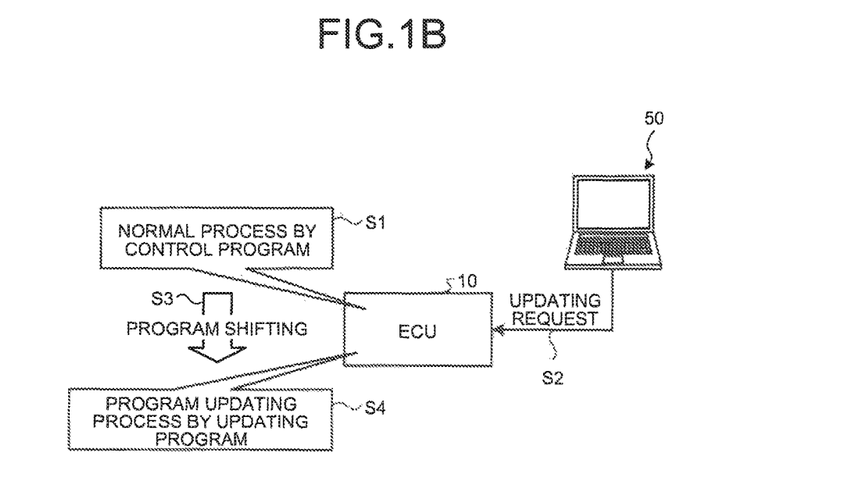
FIG. 1B is a diagram illustrating the outline of reprogramming.
Figure 1C:
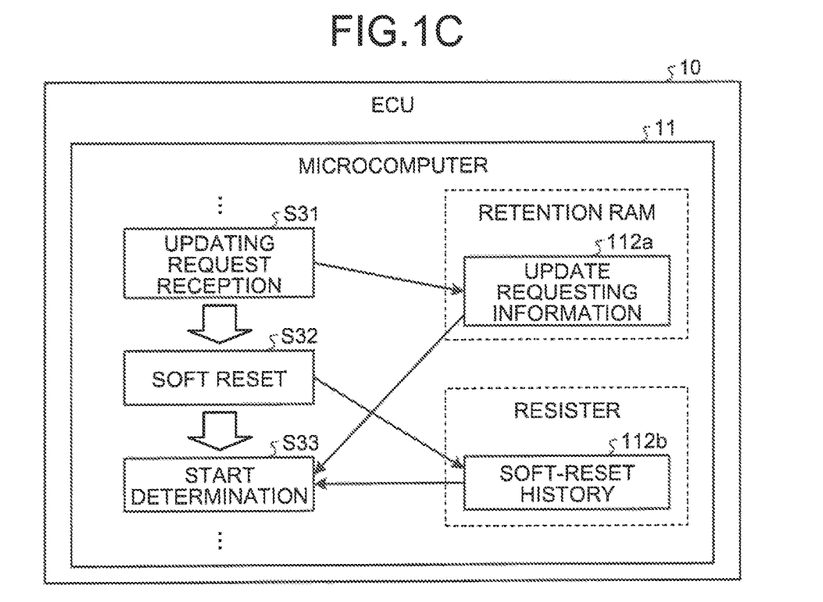
FIGS. 1C and 1D are diagrams illustrating the outline of a control program updating method according to an embodiment.
Figure 1D:
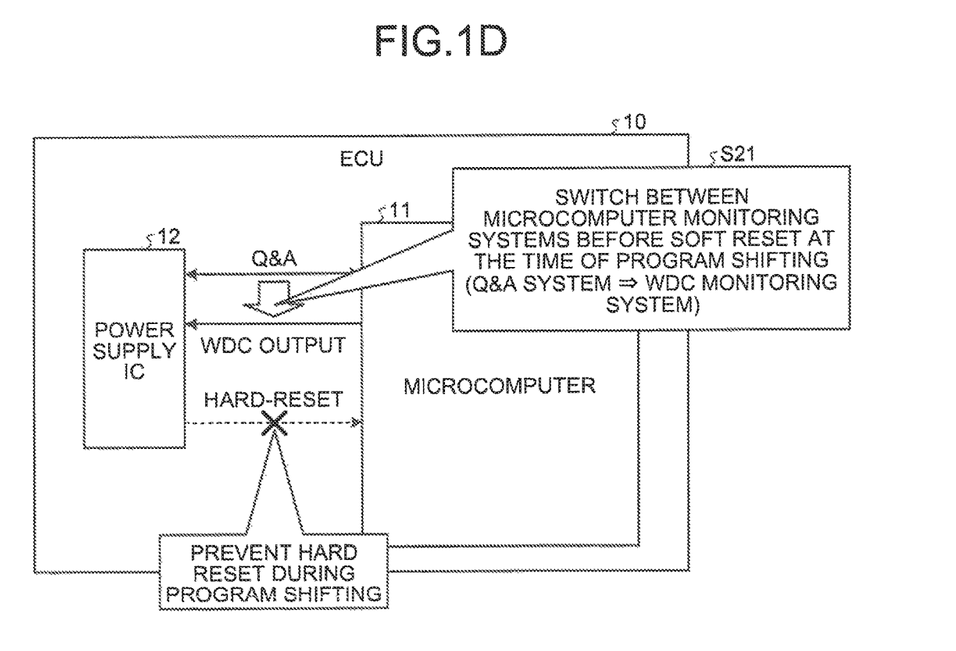

First, the outline of the control program updating method according to the present embodiment will be explained with reference to FIGS. 1A to 1D. FIG. 1A is a diagram illustrating the outline of an on-vehicle system 1. FIG. 1B is a diagram illustrating the outline of reprogramming. FIGS. 1C and 1D are diagrams illustrating the outline of the control program updating method according to the present embodiment.

As illustrated in FIG. 1A, a vehicle C includes the on-vehicle system 1. The on-vehicle system 1 includes ECUs 10-1 to 10-n. The ECUs 10-1 to 10-n are connected with one another by a network N, such as a Controller Area Network (CAN), in a communicable manner so as to electronically control respective control targets 20-1 to 20-*n* by executing control programs. The control targets 20-1 to 20-*n* include various systems such as an engine, a transmission, and a car navigation device.

There exists a case where a control program executed by each of the ECUs 10 is to be updated when a function is to be added thereto, or when an abnormality is found out after the fact. In this case, as illustrated in FIG. 1B, an updating terminal 50 is connected to the ECU 10 to be updated through the CAN etc., and reprogramming is performed thereon.

In the reprogramming, a power supply of the ECU 10 is first turned on to start a control program, and the ECU 10 is turned into a state where a normal process is executed by this control program (Step S1).

In this state, when an updating request is transmitted from the updating terminal 50 by command input etc. (Step S2), program shifting for starting an updating program, instead of the control program, is to be performed in the ECU 10 that has received this updating request (Step S3). When the updating program is started, the ECU 10 executes a program updating process by using the updating program (Step S4).

In the program shifting, as illustrated in FIG. 1C, an updating request reception is performed (Step S31), and then a microcomputer 11 is soft-reset that is a main processing unit of the ECU 10 (Step S32). The soft-reset microcomputer 11 performs a start determination for determining whether a control program is to be started or an updating program is to be started (Step S33).

In this start determination, the microcomputer 11 of the conventional configuration starts an updating program by using the soft reset as an opportunity, for example. However, in this case, there exists a fear that an updating program is started when the microcomputer 11 is soft-reset by chance even though an updating request reception is not performed, namely, without undergoing a correct procedure.

Regarding this point, performance of an updating request reception may be expanded in the RAM as one piece of information on program start and this information may be referred after a soft reset, however in a common RAM, there exists possibility that RAM garbling etc. occurs by the soft reset to obtain an incorrect value.

Therefore, in the control program updating method according to the present embodiment, as illustrated in FIG. 1C, when an updating request reception is performed, the microcomputer 11 is to write update requesting information 112*a* into a retention RAM, which indicates that the updating request reception is performed.

The retention RAM includes a RAM area for holding information even when the microcomputer 11 is soft-reset, in other words, a RAM area that is able to hold information as long as a device power source is held, and includes a Static Random Access Memory (SRAM) constituted of flip-flop, for example.

In the control program updating method according to the present embodiment, when being soft-reset, the microcomputer 11 leaves, in a resister, a soft-reset history 112*b* indicating that this soft reset is performed. The resister also includes a storage area that is constituted of flip-flop etc. and is able to hold information as long as a device power source is held.

Moreover, in the control program updating method according to the present embodiment, the microcomputer 11 is to perform a start determination with reference to both of the update requesting information 112*a* and the soft-reset history 112*b* so as to start an updating program after receiving the updating request and performing the soft reset.

Thus, an updating program is able to be started only when an updating request reception, which is a correct procedure, is undergone and a soft reset is performed. In other words, it is possible to prevent an event such as RAM garbling and an erroneous start of an updating program caused by an improper soft reset.

Meanwhile, the ECU 10 includes a monitoring unit that monitors whether or not the microcomputer 11 normally operates and, when detecting an operation abnormality, hard-resets the microcomputer 11 by OFF/ON of a power supply, for example.

As illustrated in FIG. 1D, the monitoring unit includes a power supply Integrated Circuit (power supply IC) 12, for example. There is known, as a microcomputer monitoring system, a watchdog counter (hereinafter, may be referred to as "WDC") monitoring system that monitors an interval between pulses of a WDC signal output from the microcomputer 11, for example.

Moreover, there is known, as another microcomputer monitoring system, a question and answer (Q&A) system using the serial communication. In the Q&A system, data corresponding to "question" is periodically transmitted to the microcomputer 11 from the power supply IC 12. The microcomputer 11 arithmetically operates the data by a predetermined instruction and transmits, as "answer", the arithmetic-operation result to the power supply IC 12.

The power supply IC 12 evaluates a communication timing and a content of this answer so as to monitor an operation state of the microcomputer 11. It can be said that the Q&A system performs more specific monitoring because the evaluation performed by the Q&A system further includes the evaluation of the content of the answer etc. The ECU 10 according to the present embodiment employs the Q&A system during execution of a normal process by a control program.

It is preferable that the power supply IC 12 continues monitoring the microcomputer to be able to detect an incorrect state, such as hang-up, even during reprogramming that includes program shifting. Note that disturbance is easily caused in a communication timing between the power supply IC 12 and the microcomputer 11 because processing load on the microcomputer 11 side increases during the program shifting.

Moreover, in a Q&A system, a communication sequence between a question and an answer, which includes a timing etc., is finely defined. Furthermore, serial communication having a comparatively low speed is employed, and thus it is assumed that the communication timing is more easily disturbed during the program shifting. When the communication timing is disturbed, there exists a fear that the microcomputer 11 is erroneously hard-reset by the power supply IC 12 during the program shifting, for example.

Therefore, as illustrated in FIG. 1D, in the control program updating method according to the present embodiment, a microcomputer monitoring system is to be switched, at the time of program shifting, from a Q&A system into a WDC monitoring system before a soft reset (Step S21).

In this manner, the microcomputer monitoring system is switched, at the time of program shifting, into the WDC monitoring system that is defined more loosely than the Q&A system and whose communication sequence etc. is not likely to be disturbed, so that it is possible to prevent a hard reset during the program shifting as illustrated in FIG. 1D.

A more specific content of the control program updating method according to the present embodiment, which is illustrated in FIGS. 1C and 1D, will be mentioned later with reference to FIG. 2 and the following. Hereinafter, the ECU 10 to which the above control program updating method is applied will be more specifically explained.

Figure 2:
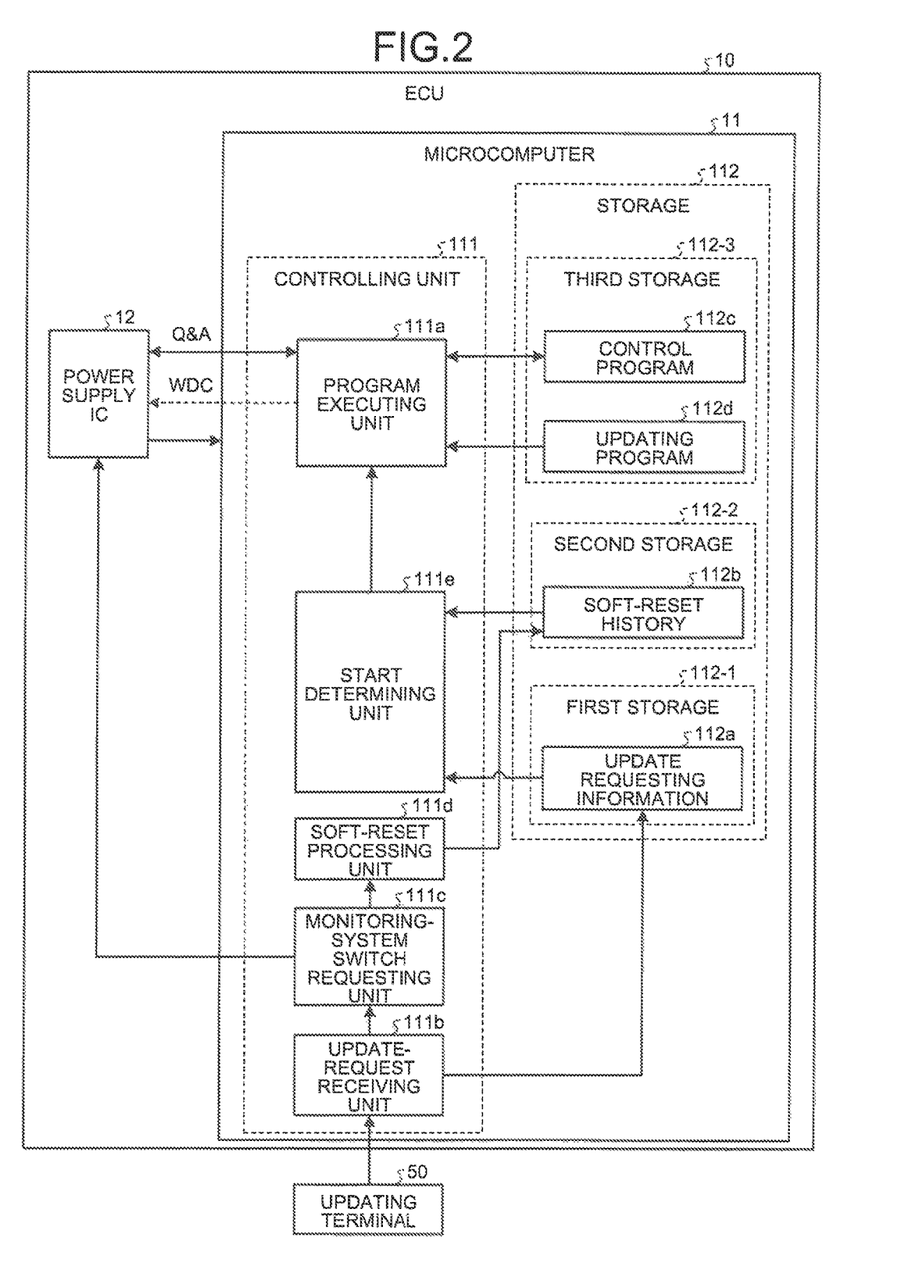
FIG. 2 is a block diagram illustrating an Electronic Control Unit (ECU) according to the embodiment.

FIG. 2 is a block diagram illustrating the ECU 10 according to the present embodiment. In FIG. 2, only configuration elements for explaining characteristics according to the present embodiment are illustrated by using function blocks, and description of common configuration elements is appropriately omitted.

In other words, each component of the corresponding apparatus illustrated in the drawings is functionally conceptual, and thus, does not always physically configured as illustrated in the drawings. Namely, a specific mode of separation or integration of each apparatus is not limited to that illustrated in the drawings. That is, all or some of the components can be configured by separating or integrating them functionally or physically in any unit, according to various types of loads, the status of use, etc.

As illustrated in FIG. 2, the ECU 10 includes the microcomputer 11 and the power supply IC 12. First, the power supply IC 12 will be explained. The power supply IC 12 monitors the microcomputer 11 in response to a monitoring-system switching request sent from the microcomputer 11 by using a Q&A system in normal processing and a WDC monitoring system in reprogramming. As a result of the monitoring, when the microcomputer 11 is in a state of an operation abnormality, the power supply IC 12 hard-resets the microcomputer 11 as needed.

The microcomputer 11 includes a control unit 111 and a storage 112. The control unit 111 includes a program executing unit 111a, an update-request receiving unit 111b, a monitoring-system switch requesting unit 111c, a soft-reset processing unit 111d, and a start determining unit 111e.

The storage 112 includes a first storage 112-1, a second storage 112-2, and a third storage 112-3. The first storage 112-1 corresponds to the above retention RAM. The second storage 112-2 corresponds to the above resister.

The first storage 112-1 stores the update requesting information 112a. The second storage 112-2 stores the soft-reset history 112b. The third storage 112-3 stores a control program 112c and an updating program 112d.

The control unit 111 includes, for example, a Central Processing Unit (CPU) for controlling a whole of the microcomputer 11. The program executing unit 111a reads the control program 112c or the updating program 112d from the third storage 112-3 and executes it, in response to a start instruction sent from the start determining unit 111e.

The program executing unit 111a reads and executes the control program 112c in normal processing so as to realize an electronic-control function assigned to the ECU 10. The program executing unit 111a reads and executes the updating program 112d in reprogramming and applies updating data to the control program 112c so as to rewrite the control program 112c.

The updating data (not illustrated) for the control program 112c is, for example, downloaded from a server device, installed from the updating terminal 50, or read through a portable storage medium, whereby the updating data is able to be applied to the microcomputer 11.

The program executing unit 111a executes a process in response to a microcomputer monitoring system of the power supply IC 12, such as a process (hereinafter, may be referred to as "Q&A process") for operating and transmitting an answer of a question in a Q&A system and a process (hereinafter, may be referred to as "WDC outputting process") for outputting a WDC signal in a WDC monitoring system.

The update-request receiving unit 111b receives an updating request sent from the updating terminal 50. The update-request receiving unit 111b writes, into the first storage 112-1, the update requesting information 112a indicating that the updating request is received. The update-request receiving unit 111b informs the monitoring-system switch requesting unit 111c that the updating request is received.

The monitoring-system switch requesting unit 111c transmits, to the power supply IC 12, a monitoring-system switching request for switching a microcomputer monitoring system from a Q&A system into a WDC monitoring system, on the basis of the information sent from the update-request receiving unit 111b.

Figure 3A:
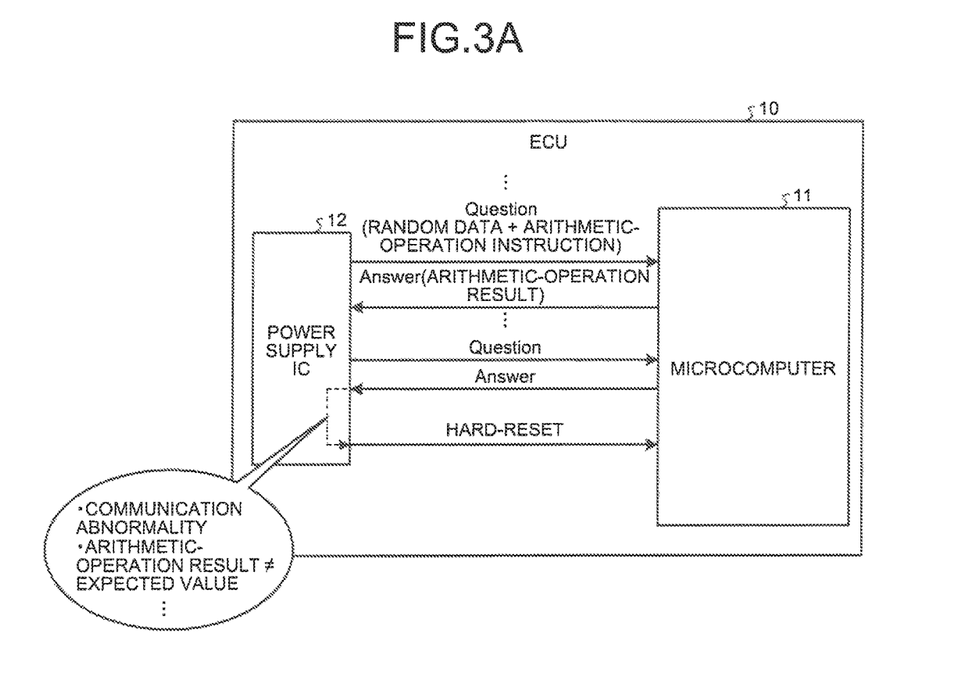
FIG. 3A is a diagram illustrating the outline of a question and answer (Q&A) system.
Figure 3B:
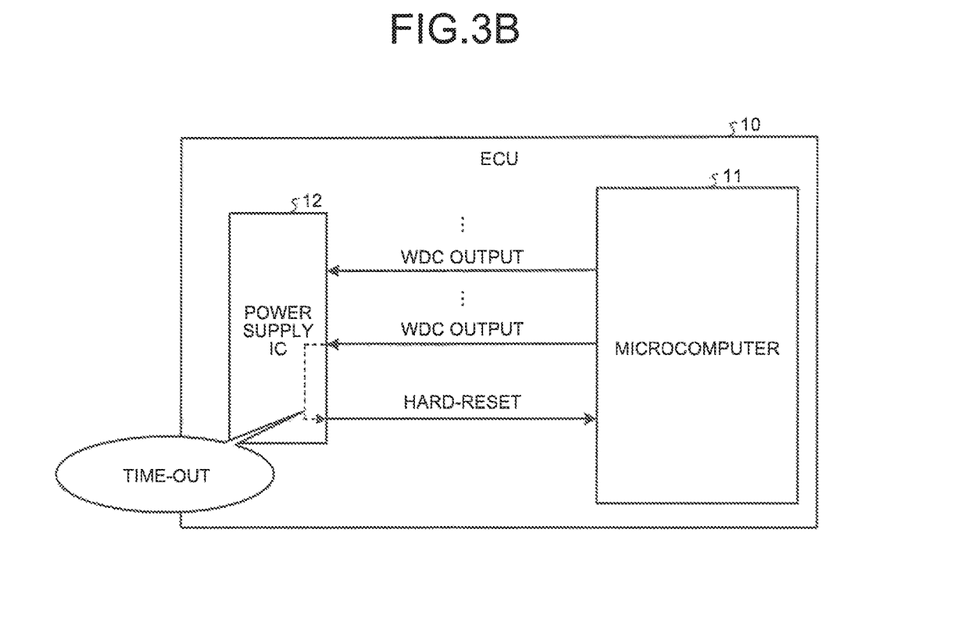
FIG. 3B is a diagram illustrating the outline of a watchdog counter (WDC) monitoring system.
Figure 3C:
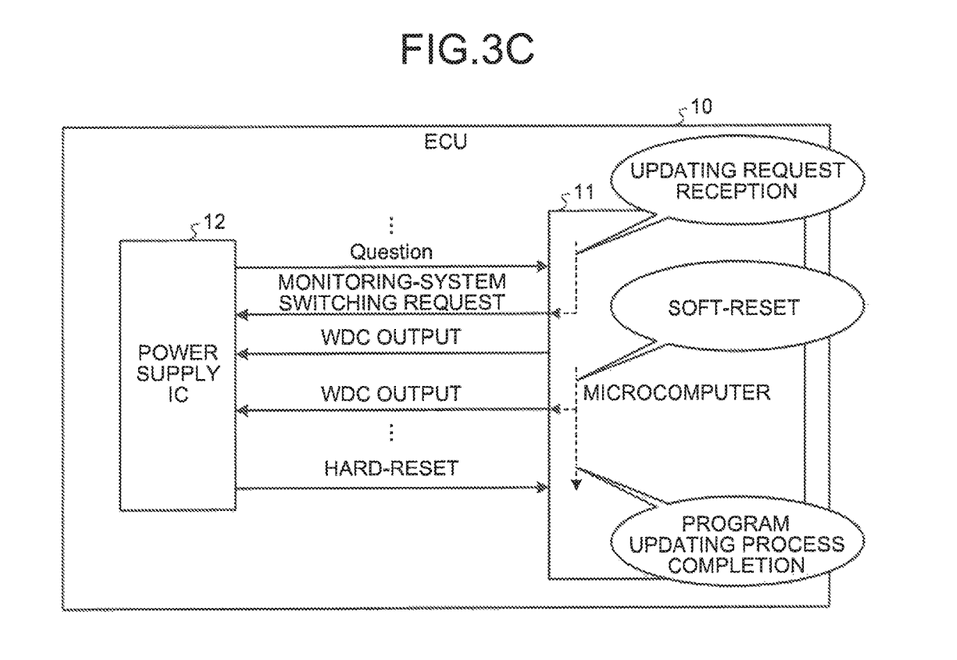
FIG. 3C is a diagram illustrating a monitoring-system switching sequence at the time of program shifting.

The switching between the monitoring methods at the time of program shifting will be more specifically explained with reference to FIGS. 3A to 3C. FIG. 3A is a diagram illustrating the outline of the Q&A system. FIG. 3B is a diagram illustrating the outline of the WDC monitoring system. FIG. 3C is a diagram illustrating the monitoring-system switching sequence at the time of program shifting. The Q&A system and the WDC monitoring system have already been explained, however, they will be complemented with reference to FIGS. 3A and 3B.

As illustrated in FIG. 3A, in the Q&A system, for example, random data and an arithmetic-operation instruction in response to a question are transmitted to the microcomputer 11 from the power supply IC 12.

The microcomputer 11 operates random data included in the question caused by an arithmetic-operation instruction that is additionally transmitted, and transmits an arithmetic-operation result to the power supply IC 12 as an answer. This exchange is periodically repeated.

When an answer of the microcomputer 11 does not return at the defined communication timing (see "communication abnormality" illustrated in FIG. 3A) or when the answer is not the expected one (see "arithmetic-operation result≠expected value" illustrated in FIG. 3A), the power supply IC 12 determines that an operation abnormality occurs in the microcomputer 11 so as to hard-reset the microcomputer 11, for example.

As illustrated in FIG. 3B, in the WDC monitoring system, the power supply IC 12 monitors an interval between pulses of a WDC signal that is periodically output from the microcomputer 11. The power supply IC 12 includes a watchdog timer (not illustrated: hereinafter, may be referred to as "WDT"), when determining "time-out" by using this WDT as illustrated in FIG. 3B, the power supply IC 12 determines that an operation abnormality occurs in the microcomputer 11 so as to hard-reset the microcomputer 11, for example.

As illustrated in FIG. 3C, in the ECU 10 according to the present embodiment, when the update-request receiving unit 111b performs "updating request reception", the monitoring-system switch requesting unit 111c transmits, to the power supply IC 12, a monitoring-system switching request immediately after reception of a first question after the updating request reception.

Thus, it is possible to confirm, by the reception of the question, that communication with the power supply IC 12 is established, furthermore eliminate a time lag in operating and transmitting an answer to the question by using the serial communication, and rapidly transmit a monitoring-system switching request to the power supply IC 12.

As illustrated in FIG. 3C, in the ECU 10 according to the present embodiment, a WDC signal is output at least one time before the microcomputer 11 is "soft-reset" after transmitting a monitoring-system switching request. Thus, it is possible to prevent the power supply IC 12 from determining time-out that is due to an output delay of a WDC signal during "soft-reset", in other words, during a reboot period of the microcomputer 11 in program shifting.

As illustrated in FIG. 3C, microcomputer monitoring is continued by using the switched WDC monitoring system during a period until "program updating process completion", and the power supply IC 12 performs a hard reset after the "program updating process completion" so as to cause the microcomputer 11 to read and execute the updated control program 112c.

Returning to FIG. 2, the monitoring-system switch requesting unit 111c transmits a monitoring-system switching request to the power supply IC 12, and then informs the soft-reset processing unit 111d of this fact.

The soft-reset processing unit 111d soft-resets the microcomputer 11 after informing from the monitoring-system switch requesting unit 111c and after starting to output a WDC signal. The soft-reset processing unit 111d writes the soft-reset history 112b of the second storage 112-2 at the time of the soft reset.

When the microcomputer 11 is rebooted, the start determining unit 111e executes a start determining process for determining a program to be started on the basis of the update requesting information 112a and the soft-reset history 112b.

Figure 4:
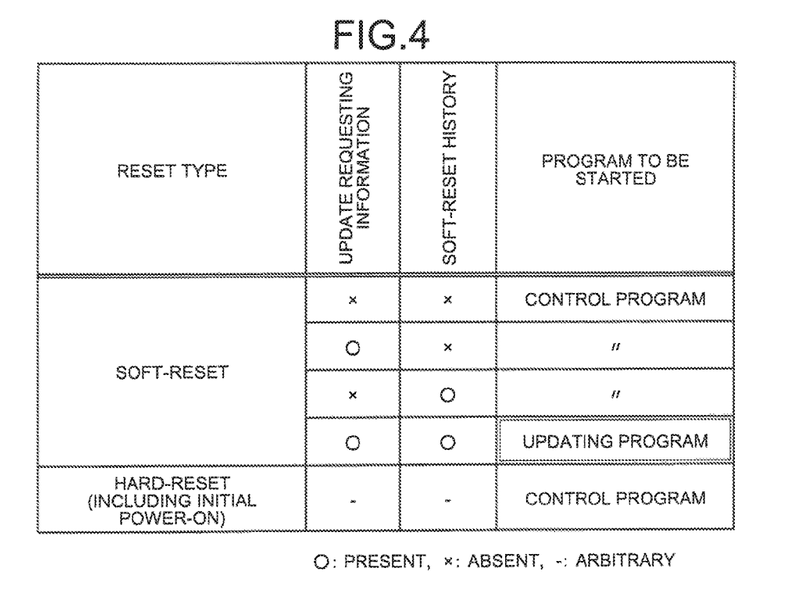
FIG. 4 is a diagram illustrating a start determining process.

Here see also FIG. 4. FIG. 4 is a diagram illustrating the start determining process. Specifically, as illustrated in FIG. 4, in a case where the microcomputer 11 is soft-reset, the start determining unit 111e determines that the updating program 112d is a program to be started only when the update requesting information 112a is "present" and further the soft-reset history 112b is "present".

That the update requesting information 112a is "present" indicates the fact that information indicating performance of an updating request reception is included in the update requesting information 112a. That the soft-reset history 112b is "present" indicates the fact that information indicating performance of a soft reset is included in the soft-reset history 112b.

When the microcomputer 11 is hard-reset, the start determining unit 111e determines that the control program 112c is a program to be started, regardless of a content of information included in the update requesting information 112a and the soft-reset history 112b.

Returning to FIG. 2, the start determining unit 111e informs, as a start instruction, the program executing unit 111a of, for example, a type of the program that is determined to be started, and causes the program executing unit 111a to execute a program according to the start instruction.

Figure 5:
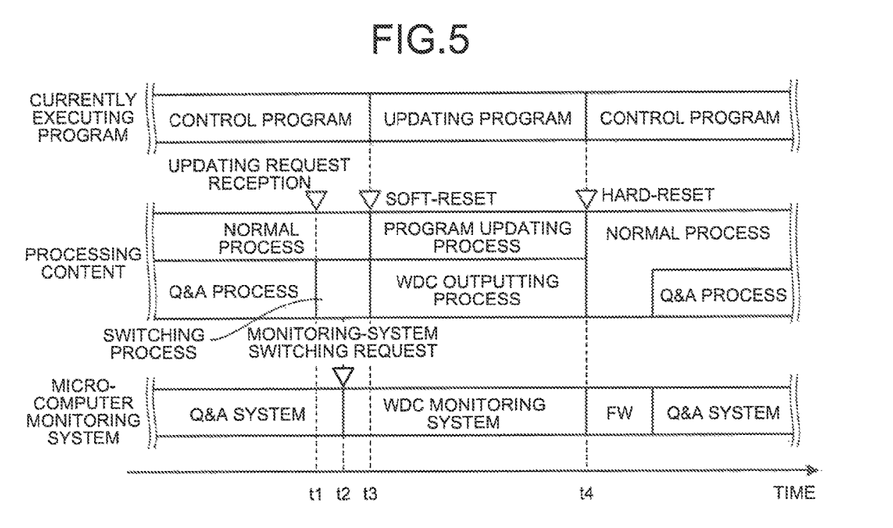
FIG. 5 is a diagram illustrating a processing sequence of the control program updating method according to the embodiment.

On the basis of the above explanation, next, a procedure for processes in the control program updating method according to the present embodiment will be explained with reference to FIG. 5. FIG. 5 is a diagram illustrating a processing sequence of the control program updating method according to the embodiment.

As illustrated in FIG. 5, first, before a time point t1, it is assumed that "currently executing program" is the control program 112c, "processing content" includes a normal process and a Q&A process, and "microcomputer monitoring system" is a Q&A system.

It is assumed that "updating request reception" is performed at the time point t1. A process associated with switching between the microcomputer monitoring systems is executed during a period from this time point t1 to a time point t3 at which the microcomputer 11 is "soft-reset". As illustrated in FIG. 5, for convenience of explanation, this process is referred to as "switching process".

In the switching process, at a time point t2 prior to the time point t3 of "soft reset", "monitoring-system switching request" is transmitted to the power supply IC 12, and the power supply IC 12 having received this "monitoring-system switching request" switches the microcomputer monitoring system into the WDC monitoring system.

Although not illustrated, in the switching process, a WDC signal is output at least one time after the microcomputer monitoring system is switched into the WDC monitoring system and the WDC monitoring is started and before "soft-reset", namely, in a period between the time points t2 to t3.

The microcomputer 11 is "soft-reset" at the time point t3. Next, when a start determination of a program, which is to be started in association with the reboot of the microcomputer 11, is performed and a starting condition of the updating program 112d is satisfied (see FIG. 4), the updating program 112d is started and "currently executing program" becomes the updating program 112d, and "processing content" comes to include a program updating process and a WDC outputting process.

When the program updating process is completed, "hard reset" is performed at a time point t4 by power supplying control of the power supply IC 12, the control program 112c is started in accordance therewith, and the control program 112c becomes "currently executing program" thereafter.

A period after "hard reset", which is complementarily illustrated, is one that is referred to as "First Window (FW)". In a predetermined time interval during this "FW", when the serial communication of the Q&A system is not started or a WDC signal of the WDC monitoring system is not input, the power supply IC 12 resets the microcomputer 11.

Figure 6:
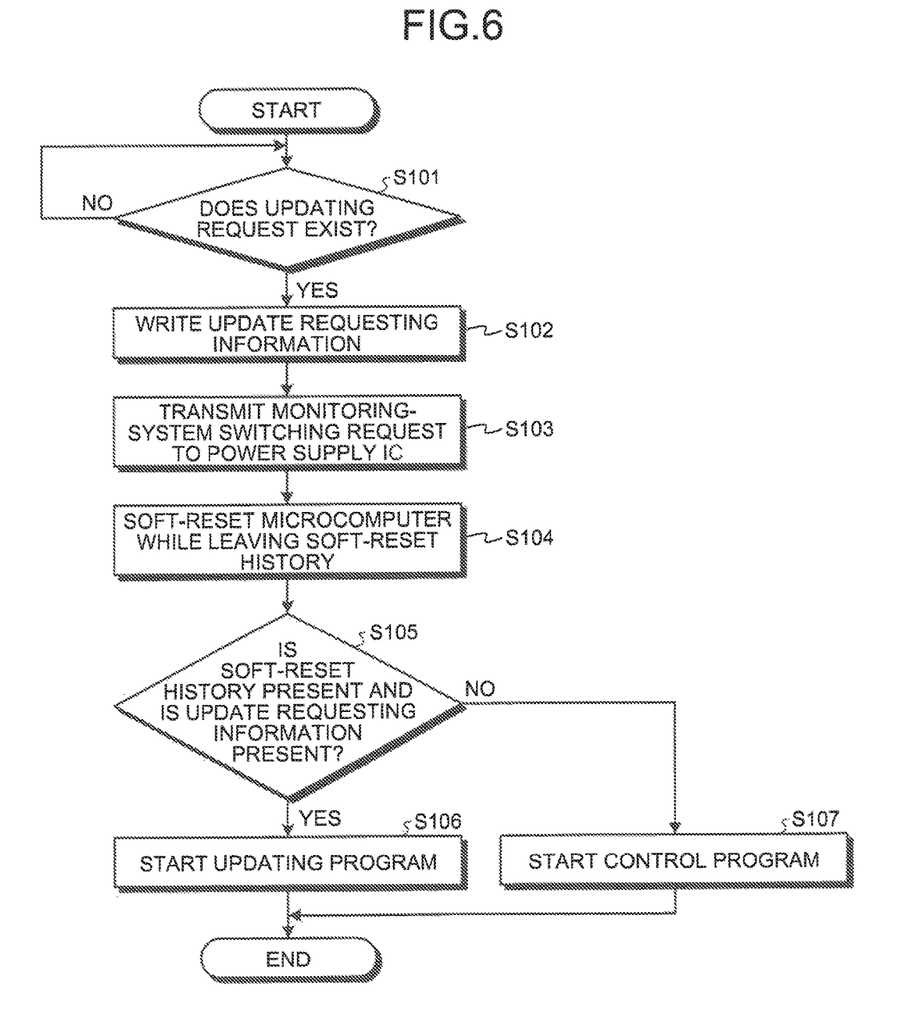
FIG. 6 is a flowchart illustrating a procedure for processes to be executed by a microcomputer of the ECU according to the embodiment.

Next, a procedure for processes to be executed by the microcomputer 11 of the ECU 10 according to the present embodiment will be explained with reference to FIG. 6. FIG. 6 is a flowchart illustrating a procedure for processes to be executed by the microcomputer 11 of the ECU 10 according to the present embodiment.

Herein, a procedure for processes is illustrated, which are up to the start determining process after the soft reset in a case where an updating request from the updating terminal 50 is received. As a premise, it is assumed that the program executing unit 111a is in executing the control program 112c and the microcomputer monitoring system is the Q&A system.

As illustrated in FIG. 6, the update-request receiving unit 111b first determines whether or not there exists an updating request from the updating terminal 50 (Step S101). When there exists an updating request (Step S101: Yes), the update-request receiving unit 111b receives this updating request, and writes the update requesting information 112a indicating that an updating request reception is performed (Step S102). When there exists no updating request (Step S101: No), the processes from Step S101 are repeatedly executed.

The monitoring-system switch requesting unit 111c transmits before a soft reset, to the power supply IC 12, a monitoring-system switching request (Step S103). When receiving this monitoring-system switching request, the power supply IC 12 switches a microcomputer monitoring system from a Q&A system into a WDC monitoring system.

The soft-reset processing unit 111d soft-resets the microcomputer 11 while leaving the soft-reset history 112b (Step S104).

After a reboot caused by the soft reset of the microcomputer 11, the start determining unit 111e determines whether or not the soft-reset history 112b is "present" and further the update requesting information 112a is "present" (Step S105).

When a determination condition of Step S105 is satisfied (Step S105: Yes), the start determining unit 111e causes the program executing unit 111a to start the updating program 112d (Step S106).

On the other hand, the determination condition of Step S105 is not satisfied (Step S105: No), the start determining unit 111e causes the program executing unit 111a to start the control program 112c (Step S107). Hereby, the procedure for processes up to the start determining process is completed.

As described above, the ECU 10 (corresponding to one example of "controller") according to the present embodiment includes the microcomputer 11 (corresponding to one example of "main processing unit") and the storage 112.

The microcomputer 11 shifts, when receiving an updating request of this control program 112c during executing the control program 112c, to program shifting through a soft reset (corresponding to one example of "restart in state where device power source is held"). The program shifting starts the updating program 112d for updating the control program 112c instead of the control program 112c.

The storage 112 is configured to be able to hold information while the device power source is held. The microcomputer 11 causes the storage 112 to store, before the soft reset, the update requesting information 112a indicating that the updating request is received, causes the storage 112 to store the soft-reset history 112b (corresponding to one example of "restart history"), and performs a start determination on the updating program 112d on the basis of the update requesting information 112a and the soft-reset history 112b that are referred after the soft reset.

Thus, by employing the ECU 10 according to the present embodiment, it is possible to prevent an erroneous start of the updating program 112d.

The microcomputer 11 starts the updating program 112d when the update requesting information 112a includes information indicating that the updating request is received and the soft-reset history 112b includes information indicating that the soft reset is performed.

Thus, by employing the ECU 10 according to the present embodiment, it is possible to start the updating program 112d only when an updating request reception, which is a correct procedure, is undergone and the soft reset is performed. In other words, it is possible to prevent an erroneous start of the updating program caused by an event, such as RAM garbling, and an improper soft reset.

The storage 112 includes the first storage 112-1 (corresponding to one example of "first storage area") and the second storage 112-2 (corresponding to one example of "second storage area"), and the microcomputer 11 stores the update requesting information 112a in the first storage 112-1 and stores the soft-reset history 112b in the second storage 112-2.

Thus, by employing the ECU 10 according to the present embodiment, the update requesting information 112a and the soft-reset history 112b are separately stored in respective storage areas, it is possible to improve the possibility that data of the update requesting information 112a and the soft-reset history 112b are secured. In other words, it is possible to improve the accuracy in a start determination of the updating program 112d so as to contribute to preventing an erroneous start of the updating program 112d.

The ECU 10 further includes the power supply IC 12 (corresponding to one example of "monitoring unit") that monitors the microcomputer 11 by a Q&A system (corresponding to one example of "first monitoring method") for transmitting, to the microcomputer 11, a transmission content corresponding to a question and for evaluating an answer to the question from the microcomputer 11.

The microcomputer 11 causes, when receiving the updating request, the power supply IC 12 to perform switching from the Q&A system into a WDC monitoring system (corresponding to one example of "second monitoring method") for monitoring a WDC signal (corresponding to one example of "watchdog signal") of the microcomputer 11.

Thus, by employing the ECU 10 according to the present embodiment, it is possible to prevent, at the time of updating the control program 112c, an erroneous reset caused by the power supply IC 12.

The microcomputer 11 causes, before the soft reset, the power supply IC 12 to perform the switching from the Q&A system into the WDC monitoring system. In other words, in the ECU 10 according to the present embodiment, the microcomputer 11 switches the microcomputer monitoring system into the WDC monitoring system that is defined more loosely than the Q&A system and whose communication sequence is simple and not likely to be disturbed, before the soft reset, not after the soft reset when a heavy processing load is inclined to be burdened and the disturbance in a communication timing is assumed to easily occur.

Thus, by employing the ECU 10 according to the present embodiment, it is possible to reduce a risk in which the power supply IC 12 determines an operation abnormality during program shifting and to prevent a hard reset caused by the power supply IC 12 during program shifting.

Note that, in the above embodiment, the update requesting information 112a is stored in the retention RAM area, and the soft-reset history 112b is stored in the resister. However, it is sufficient that the storage is configured to be able to hold information as long as the device power source is held, and thus it is not intended that the storage destinations of the update requesting information 112a and the soft-reset history 112b be limited.

In the above embodiment, the ECU 10 is provided in the vehicle C, it is needless to say that the ECU 10 may be provided in, for example, a ship, an airplane, etc. not limited to the vehicle C.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A controller comprising:
   a main processing unit that shifts, when receiving an updating request of a control program during execution of the control program, to program shifting through a restart in a state where a device power source is held, the program shifting starting an updating program for updating the control program instead of starting the control program; and
   a storage that stores information while the device power source is held, wherein the main processing unit causes the storage to store, before the restart, update requesting information indicating that the updating request of the control program is received, causes the storage to store a history of the restart, and performs a start determination on the updating program based on the update requesting information and the history of the restart that are referred after the restart, and wherein the storage includes first and second storage areas, and the main processing unit stores the update requesting information in the first storage area and stores the history of the restart in the second storage area.

2. The controller according to claim 1, wherein the main processing unit starts the updating program when the update requesting information includes information indicating that the updating request of the control program is received and the history of the restart includes information indicating that the restart is performed.

3. The controller according to claim 2, further comprising:

a monitoring unit that monitors the main processing unit by a first monitoring method for transmitting, to the main processing unit, a transmission content corresponding to a question and for evaluating an answer to the question from the main processing unit, wherein the main processing unit causes, when receiving the updating request of the control program, the monitoring unit to perform switching from the first monitoring method into a second monitoring method for monitoring a watchdog signal of the main processing unit.

4. The controller according to claim 3, wherein the main processing unit causes, before the restart, the monitoring unit to perform the switching from the first monitoring method into the second monitoring method.

5. The controller according to claim 1, further comprising:

a monitoring unit that monitors the main processing unit by a first monitoring method for transmitting, to the main processing unit, a transmission content corresponding to a question and for evaluating an answer to the question from the main processing unit, wherein the main processing unit causes, when receiving the updating request of the control program, the monitoring unit to perform switching from the first monitoring method into a second monitoring method for monitoring a watchdog signal of the main processing unit.

6. The controller according to claim 5, wherein the main processing unit causes, before the restart, the monitoring unit to perform the switching from the first monitoring method into the second monitoring method.

7. A control program updating method comprising:

shifting, when receiving an updating request of a control program during execution of the control program, to program shifting through a restart in a state where a device power source is held by using a controller including a storage that stores information while the device power source is held, the program shifting starting an updating program for updating the control program instead of starting the control program, wherein the shifting includes:

causing the storage to store, before the restart, update requesting information indicating that the updating request of the control program is received;

causing the storage to store a history of the restart; and performing a start determination on the updating program based on the update requesting information and the history of the restart that are referred after the restart, and wherein the storage includes first and second storage areas, and the main processing unit stores the update requesting information in the first storage area and stores the history of the restart in the second storage area.

* * * * *